(12) United States Patent
Tanaka et al.

(10) Patent No.: US 9,043,565 B2
(45) Date of Patent: May 26, 2015

(54) STORAGE DEVICE AND METHOD FOR CONTROLLING DATA INVALIDATION

(71) Applicants: Hiroaki Tanaka, Kanagawa (JP); Takeyuki Minamimoto, Tokyo (JP)

(72) Inventors: Hiroaki Tanaka, Kanagawa (JP); Takeyuki Minamimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 13/680,341

(22) Filed: Nov. 19, 2012

(65) Prior Publication Data

US 2014/0075096 A1  Mar. 13, 2014

Related U.S. Application Data (60) Provisional application No. 61/697,881, filed on Sep. 7, 2012.

(51) Int. Cl.
  *G06F 12/06* (2006.01)
  *G06F 12/02* (2006.01)
  *G06F 3/06* (2006.01)

(52) U.S. Cl.
  CPC ........ *G06F 12/0246* (2013.01); *G06F 12/0269* (2013.01); *G06F 12/0253* (2013.01); *G06F 2212/7205* (2013.01); *G06F 3/0608* (2013.01); *G06F 3/0652* (2013.01); *G06F 3/0656* (2013.01); *G06F 3/0679* (2013.01)

(58) Field of Classification Search
  CPC ............ G06F 12/0253; G06F 12/0269; G06F 2212/7205
  USPC .......................................... 711/103, 155, 159
  See application file for complete search history.

(56) References Cited

U.S. PATENT DOCUMENTS

| | | | |
|---|---|---|---|
| 7,197,601 B2* | 3/2007 | Slegel et al. .................. | 711/133 |
| 2008/0195799 A1 | 8/2008 | Park | |
| 2010/0205354 A1 | 8/2010 | Suzuki | |
| 2012/0191913 A1* | 7/2012 | Damodaran et al. .......... | 711/122 |
| 2012/0221776 A1 | 8/2012 | Yoshihashi et al. | |
| 2014/0047210 A1* | 2/2014 | Cohen et al. .................. | 711/202 |
| 2014/0237164 A1* | 8/2014 | Le et al. ........................ | 711/103 |

FOREIGN PATENT DOCUMENTS

| | | | |
|---|---|---|---|
| JP | 2008-198208 A | 8/2008 |
| JP | 4164118 B1 | 10/2008 |
| JP | 2011-90496 A | 5/2011 |
| JP | 2011-128998 A | 6/2011 |

* cited by examiner

*Primary Examiner* — Than Nguyen
(74) *Attorney, Agent, or Firm* — Oblon, McClelland, Maier & Neustadt, L.L.P.

(57) ABSTRACT

A storage device according to an embodiment includes: a host interface connected to a host; a memory including a first buffer that stores a logical address range designated by an invalidation instruction received from the host via the host interface and a second buffer that stores an internal logical address range which is an area combination with the logical address range; a nonvolatile memory; and a controller. The controller includes: an invalidation instruction processor that stores the logical address range designated by the invalidation instruction in the first buffer; an area combination executor that generates the internal logical address range by the area combination with the logical address range and stores the internal logical address range in the second buffer; and an invalidation executor that executes invalidation processing on the nonvolatile memory based on the internal logical address range.

20 Claims, 8 Drawing Sheets

Command

| DATA SET MANAGEMENT (feature=0001h) |
|---|

Data (Host → Device)

| Range Length #0 | LBA Value #0 | ⎫ LBA Range Entry |
|---|---|---|
| Range Length #1 | LBA Value #1 | |
| ... | ... | |
| Range Length #63 | LBA Value #63 | |

| Range Length #64 | LBA Value #64 |
|---|---|
| ... | ... |
| Range Length #127 | LBA Value #127 |

| Range Length #0 | LBA Value #0 | } Internal LBA Range Entry |
| Range Length #1 | LBA Value #1 | |
| ... | ... | |
| Range Length #n-1 | LBA Value #n-1 | |

FIG.5A

Case a.

FIG.5B

Case b.

FIG.5C

Case c.

STORAGE DEVICE AND METHOD FOR CONTROLLING DATA INVALIDATION

CROSS-REFERENCE TO RELATED APPLICATIONS

This application is based upon and claims the benefit of priority from Provisional Patent Application No. 61/697,881, filed on Sep. 7, 2012; the entire contents of which are incorporated herein by reference.

FIELD

Embodiments of the present invention relate to a storage device and a method for controlling the storage device.

BACKGROUND

A data invalidation instruction is one of instructions issued from a host computer to a storage device and denotes an instruction to explicitly discard now unnecessary data recorded by a write command in the past. The data invalidation instruction is intended to reduce the total amount of user data to be managed by the storage device to improve the device response performance after the reduction.

DETAILED DESCRIPTION

Conventionally, when receiving a data invalidation instruction, a storage device performs data invalidation processing on each of multiple logical address range entries transmitted with the data invalidation instruction. Therefore, when the number of logical address range entries increases, it has taken enormous time to complete the processing of the data invalidation instruction.

According to the embodiments of the present invention, to solve the above problem, the processing is performed at high speed by combining multiple received logical address range entries once and promoting logical address invalidation processing according to a logical address management unit managed by a storage device. Further, when it is found that the overall logical address range managed by the storage device is invalidated, the data invalidation is processed at high speed by performing collective deletion.

According to an embodiment of the present invention, a storage device includes: a host interface connected to a host; a memory including a first buffer that stores a logical address range designated by an invalidation instruction received from the host via the host interface and a second buffer that stores an internal logical address range which is an area combination with the logical address range; a nonvolatile memory; and a controller. The controller includes: an invalidation instruction processor that stores the logical address range designated by the invalidation instruction in the first buffer; an area combination executor that generates the internal logical address range by the area combination with the logical address range and stores the internal logical address range in the second buffer; and an invalidation executor that executes invalidation processing on the nonvolatile memory based on the internal logical address range.

Hereinafter, a storage device and a method for controlling the storage device according to the embodiments will be explained in detail with reference to the accompanying drawings. Also, the present invention is not limited to these embodiments.

First Embodiment

Figure 1:
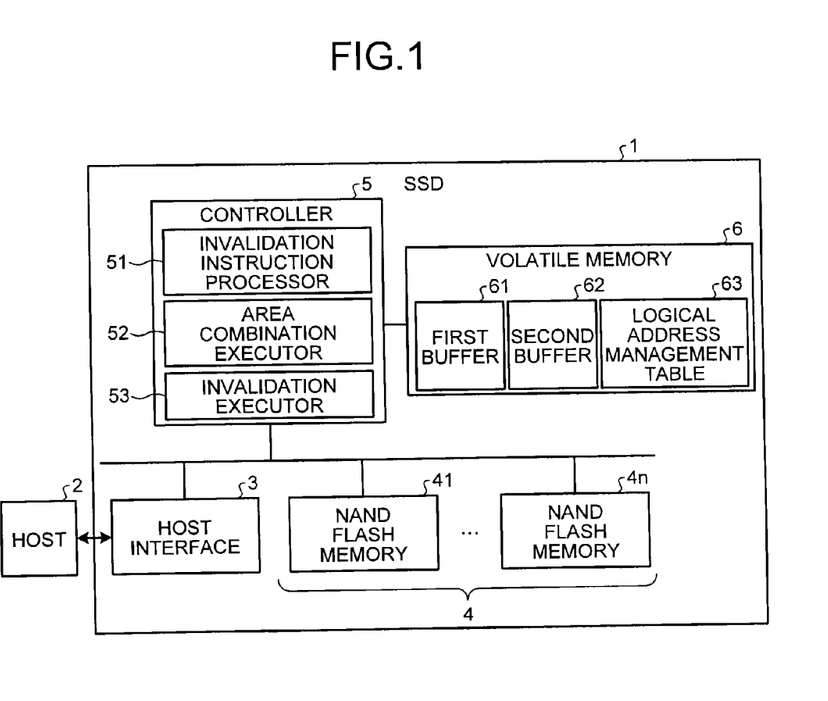
FIG. 1 is a view illustrating a configuration of a storage device according to an embodiment.

FIG. 1 is a view illustrating a configuration of a storage device 1 according to the present embodiment. The storage device 1 is, for example, an SSD (Solid State Drive) and includes a host interface 3 such as an SATA interface connected to a host 2, an NAND flash memory 41, . . . , and an NAND flash memory 4n as a nonvolatile memory 4, a controller 5, and a volatile memory 6 such as a RAM. The controller 5 includes an invalidation instruction processor 51, an area combination executor 52, and an invalidation executor 53. The volatile memory 6 includes a first buffer 61 and a second buffer 62, and further, manages a logical address management table 63 which will be described later in detail.

In commands of an ATA standard that is a standard to cause data to be transferred between the host 2 and the storage device 1 such as an SSD, a data invalidation instruction called "TRIM" is defined. By this instruction, the host 2 can report a logical address range that is no longer necessary to the storage device 1 in a sector unit. Regarding its detail, see the ATA command standard (http://www.t13.org/Documents/UploadedDocuments/docs2009/d2 015r1a-ATAATAPI_Command_Set_-_2_ACS-2.pdf). Also, its explanation will be omitted here. Such a command will be hereinafter referred to as "TRIM command." The data invalidation herein means to invalidate a physical address on a nonvolatile memory corresponding to a designated logical address, that is, to cause a state in which there is no physical address corresponding to the designated logical address. The logical address denotes, for example, an LBA (Logical Block Addressing) and the LBA denotes an address with the serial number from "0" assigned to a sector (size: 512 B, for example) and indicates the head address of data. The present embodiment is applicable to not only the TRIM command of the ATA standard but also a data invalidation instruction of other standards than ATA as long as which has a similar specification.

Figure 2:
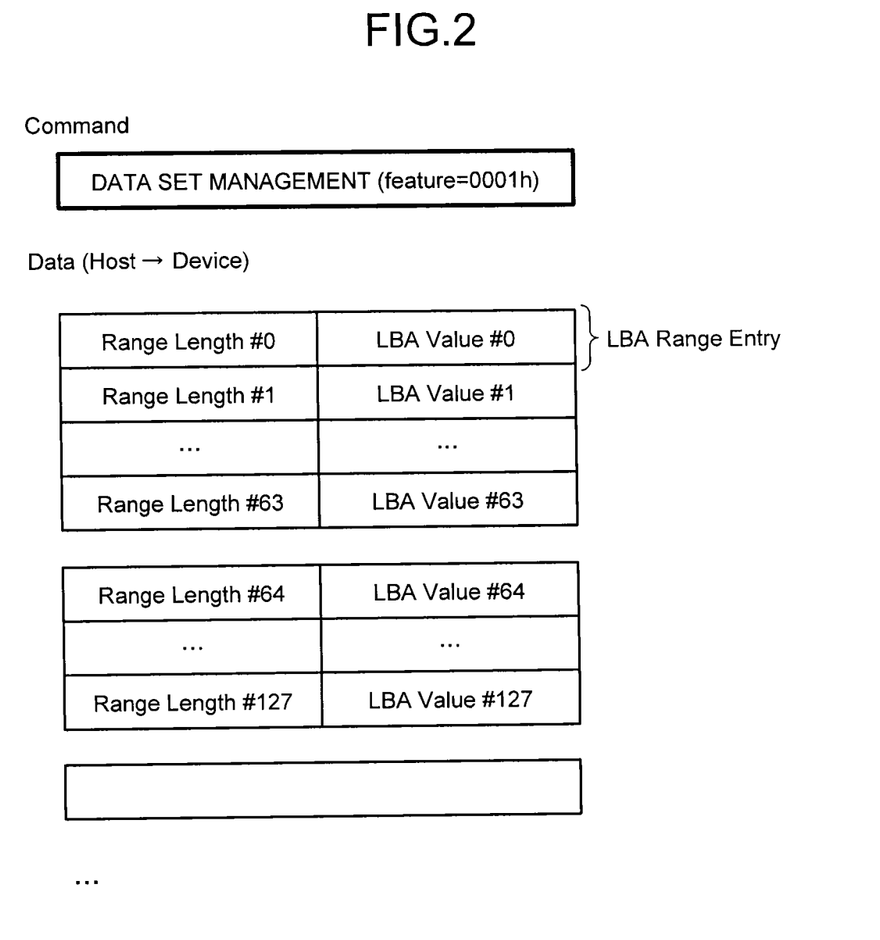
FIG. 2 is a view illustrating a configuration of a data invalidation instruction issued by a host according to an embodiment.

As a data invalidation instruction, in the case of the above-mentioned TRIM command, for example, a command and data of formats as illustrated in FIG. 2 are issued from the host 2 to the storage device 1. An invalidation area size (sector number) is described in a field of "Range Length #*" in FIG. 2 and the logical address head (lower end) of the invalidation area is described in a field of "LBA Value #*". A row formed with "Range Length #*" and "LBA Value #*" is a logical address range entry (LBA range entry). Thus, although invalidation areas designated by invalidation area sizes and the logical address heads of the invalidation areas generally described as multiple logical address range entries each are continuous logical address ranges, they are not limited by other requirements, and the invalidation areas designated by each of the multiple logical address range entries may overlap with each other or may be adjacent to each other, and the order on the logical addresses needs not be ascending order or descending order.

Figure 3:
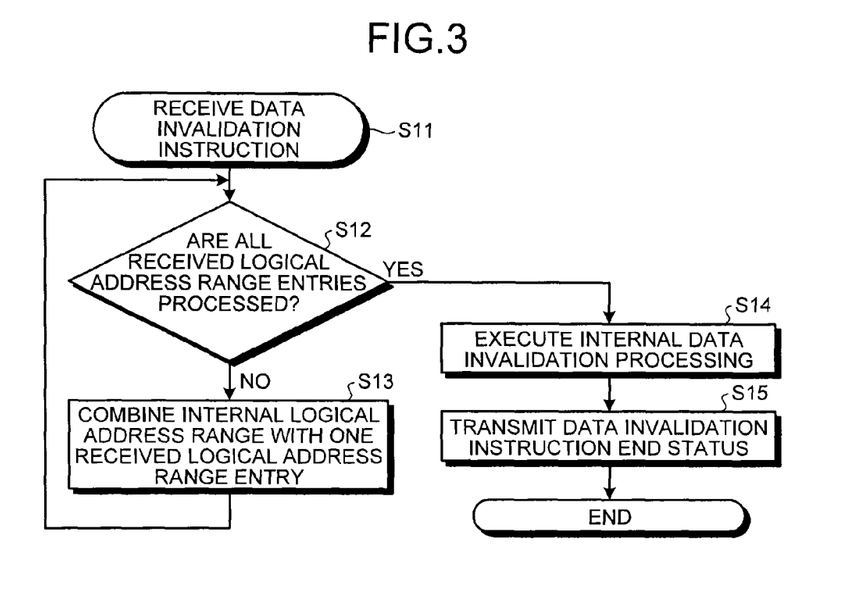
FIG. 3 is a flowchart illustrating operations in a case where a storage device according to a first embodiment receives a data invalidation instruction from a host.

With reference to the flowchart in FIG. 3, an explanation will be given on an operation at the time the storage device 1 receives a data invalidation instruction from the host 2. When the storage device 1 receives a data invalidation instruction from the host 2 (step S11), the invalidation instruction processor 51 stores one or multiple logical address range entries designated to be invalidated by the data invalidation instruction, in the first buffer 61. Further, the invalidation instruction processor 51 determines whether area combination processing is performed on all received logical address range entries of invalidation area (step S12). The "area combination" has the following meaning. For example, in a case where there are a first area indicating a logical address range and a second area indicating another logical address range, an area combination of the first area and the second area means to create the union of all logical addresses belonging to the first area and all logical addresses belonging to the second area. When not all processing is yet performed (step S12: No), a new internal logical address range, which is an area combination of a logical address range entry that is not processed by the area combination executor 52 and an internal logical address range, is stored in the second buffer 62 (step S13). This step S13 is repeated until the all received logical address range entries of the invalidation area are processed (step S12: Yes).

Figure 4:
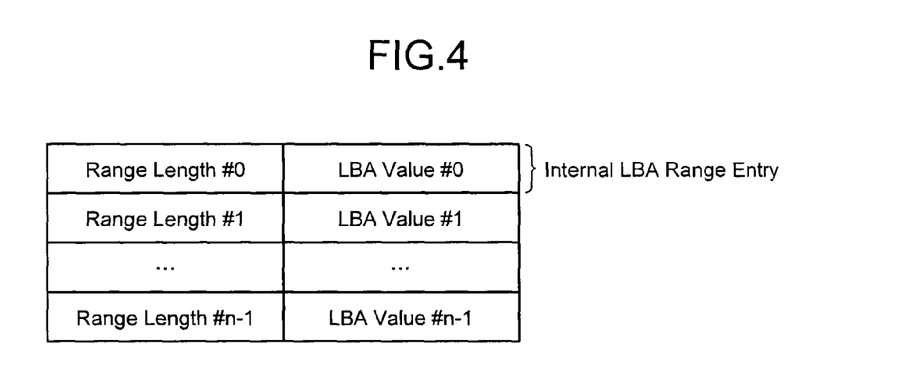
FIG. 4 is a view illustrating a configuration of an internal logical address range according to an embodiment.

The internal logical address range is one in which logical address range entries designated as invalidation areas are collected without overlap, in order from the smallest logical address (or the largest logical address), as a set of one or multiple (predetermined value n or less) continuous address ranges (internal logical address range entries). That is, the internal logical address range denotes a set of at least 0 internal logical address range entries, which do not overlap with each other, are not adjacent to each other, and are arranged in ascending order according to logical addresses, where the set is acquired by performing an area combination by the area combination executor 52 on all of at least one continuous logical address range entry designated by a data invalidation instruction as an invalidation area. Note that, the internal logical address range entries can be performed by a method in which they are not arranged in order of logical addresses, as long as the internal logical address range entries do not overlap with each other and are not adjacent to each other. The internal logical address range has a configuration as illustrated in FIG. 4, for example. An invalidation area size (sector number) is described in a field of "Range Length #*" in FIG. 4 and the logical address head (lower end) of the invalidation area is described in a field of "LBA Value #*". A row formed with "Range Length #*" and "LBA Value #*" is an internal logical address range entry (Internal LBA Range Entry). However, unlike FIG. 2, the internal logical address range entries do no overlap with each other and are not adjacent to each other, and the logical address heads indicated by a field of "LBA Value #*" are arranged in ascending order from the top to the bottom of FIG. 4.

Figure 5A:
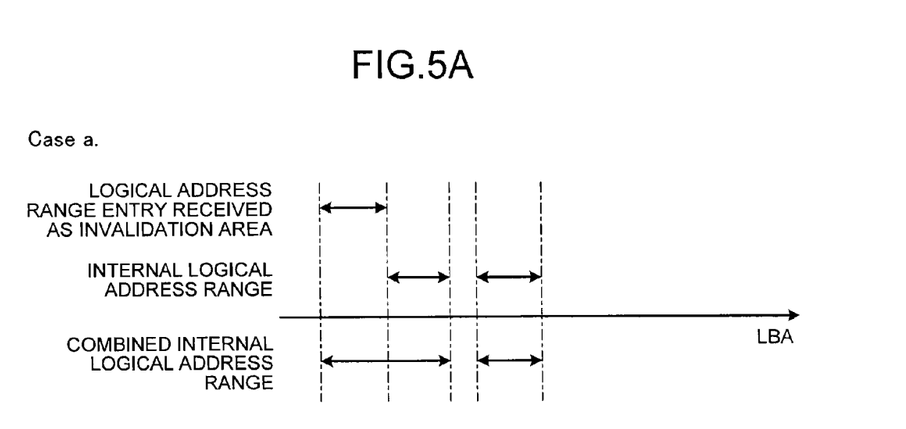
FIG. 5A to 5C are views illustrating states where a logical address range received as an invalidation area is combined with an internal logical address range in an embodiment.
Figure 5B:
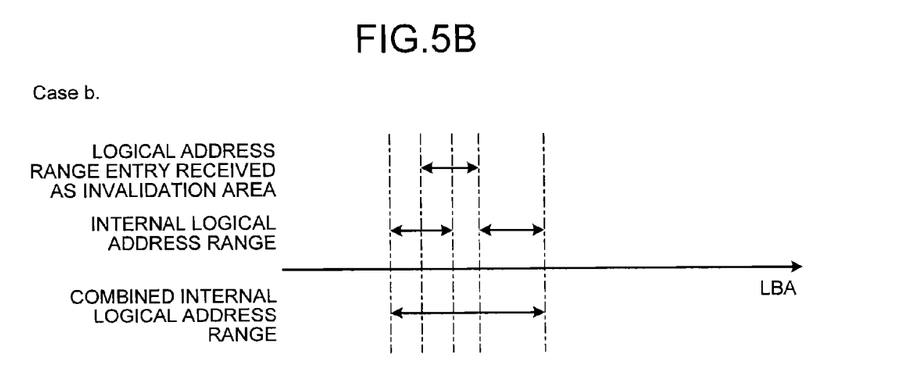
Figure 5C:
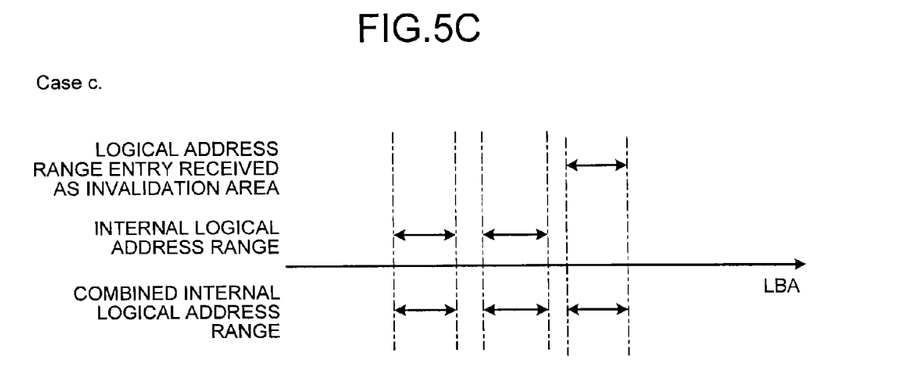

Specific examples of step S13 are illustrated in FIG. 5A to 5C. Any case of Case a. to Case c. denotes a case where one logical address range entry newly received as an invalidation area is combined to an internal logical address range formed with two internal logical address range entries. In Case a.(see FIG. 5A), a logical address range entry as an invalidation area having a logical address (LBA) continuous to an internal logical address range entry is added to the internal logical address range entry, in which the head logical address is small and which is already the internal logical address range, and, as a result, although a new internal logical address range is still formed with two internal logical address range entries, the internal logical address range entry with a smaller logical address (LBA) is enlarged. In Case b. (see FIG. 5B), a logical address range entry as a new invalidation area is combined so as to fill a gap between two internal logical address range entries that are already the internal logical address range, and, as a result, a new internal logical address range is formed with one internal logical address range entry. In Case c. (see FIG. 5C), a logical address range entry combined as a new invalidation area does not overlap with and is not adjacent to two internal logical address range entries that are already the internal logical address range, and therefore a new internal logical address range is formed with three internal logical address range entries.

When the processing of step S13 is completed for the all received logical address range entries of the invalidation area (step S12: Yes), based on the internal logical address range generated as described above, the invalidation executor 53 performs internal data invalidation processing on the NAND flash memory 41, . . . , and the NAND flash memory 4n (step S14).

Figure 6:
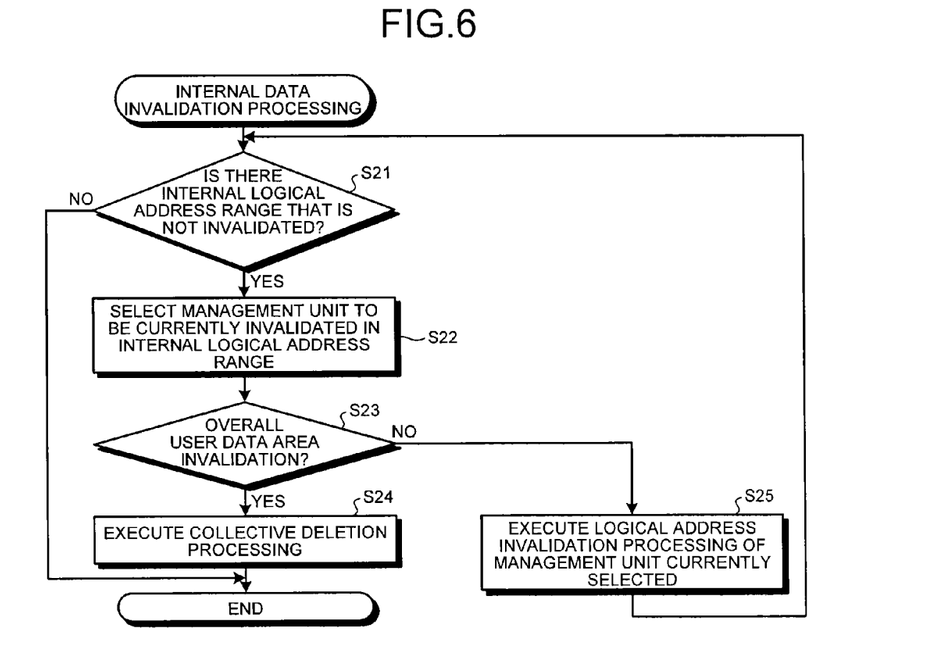
FIG. 6 is a flowchart illustrating details of internal data invalidation processing in an embodiment.

Detail of the internal data invalidation processing performed by the invalidation executor 53 is illustrated in the flowchart of FIG. 6. First, it is determined whether there is an internal logical address range that is not invalidated yet (step S21). In a case where there is no internal logical address range that is not invalidated (step S21: No), the internal data invalidation processing is finished. In a case where there is an internal logical address range that is not invalidated yet (step S21: Yes), a management unit to be currently invalidated is selected from management units including the internal logical address range that is not invalidated yet (step S22). This management unit denotes a management unit of a logical address (LBA) in the storage device 1 such as an SSD, and includes many sectors. As a way of management unit selection, for example, a management unit with the smallest head address is selected from management units including a range in which the internal logical address range illustrated in FIG. 4 is not invalidated.

After step S22, it is determined whether the internal logical address range indicates overall user data area invalidation (step S23). To be more specific, it is determined whether the internal logical address range is one consecutive logical address range, the head address is a head address (=0) of the entire LBA and the logical address range is a length of overall user data.

Figure 7:
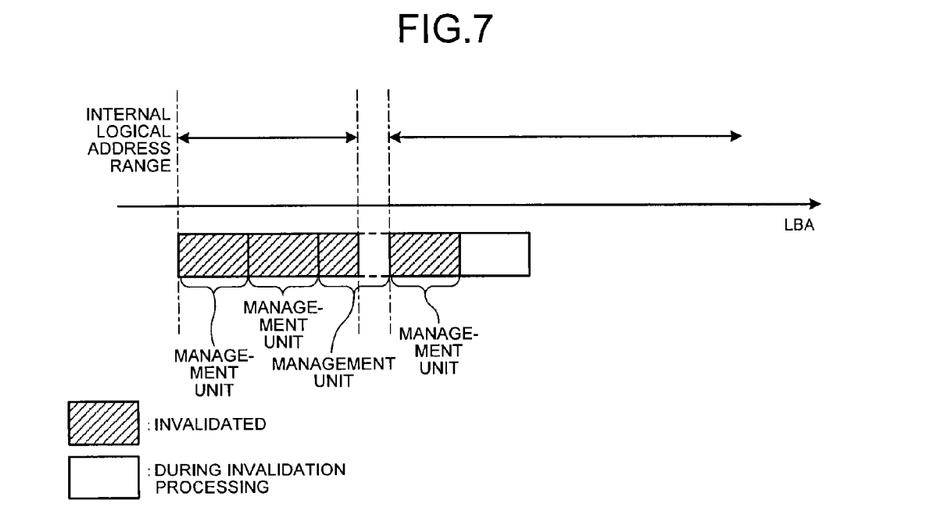
FIG. 7 is a view illustrating a state where an internal logical address range is invalidated every management unit in an embodiment.

In a case where it is not the overall user data area invalidation (step S23: No), invalidation processing is performed on logical address of the management unit selected in step S22 (step S25). Returning to step S21 after step S25, when there is still an internal logical address range that has to be invalidated (step S21: Yes), the next management unit is selected (step S22), and the internal logical address range is not the overall user data area invalidation (step S23: No), the invalidation processing is performed on logical address of the next management unit and this invalidation processing per management unit is repeated as long as these loop conditions are satisfied. FIG. 7 illustrates a state where the internal logical address range is invalidated per management unit in this way. In FIG. 7, the invalidation processing is performed in order from a management unit with the smaller LBA. As illustrated in FIG. 7, the internal logical address range is not necessarily aligned in a management unit. In a case where an invalidation instruction is given to the logical address of a partial area of a certain management unit (for example, the third management unit from the left in FIG. 7), the invalidation processing is performed on a partial logical address of the management unit. Note that, although it is not illustrated in the flowchart of FIG. 6, in second and third embodiments that will be described later, generally, there can occur a case where the internal logical address range is enlarged by a new data invalidation instruction during such invalidation processing per management unit.

Figure 8:
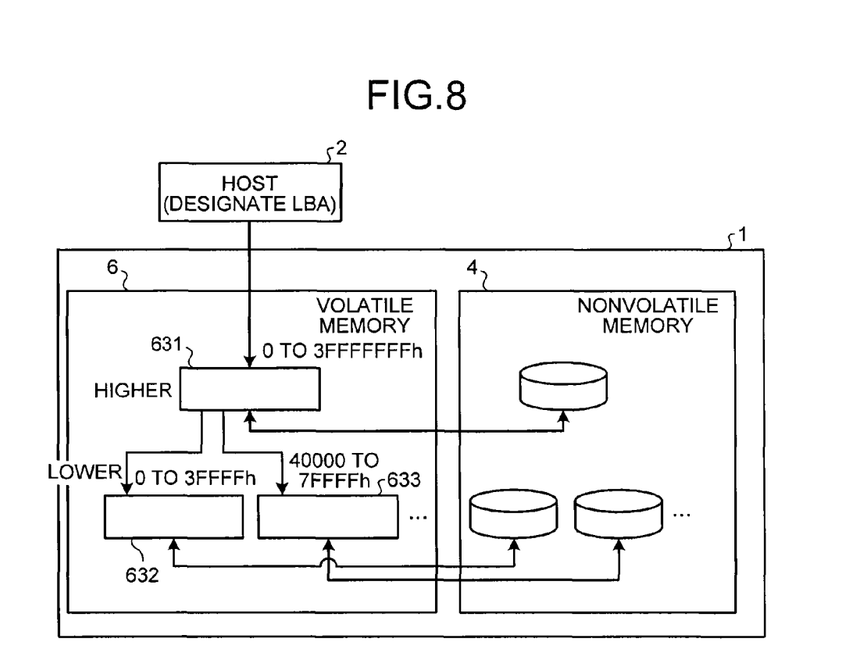
FIG. 8 is a view illustrating a part of a configuration of a storage device, focusing on a logical address management table in an embodiment.

Here, in order to understand details of the invalidation processing, the method for managing the logical address in the storage device 1 will be explained with reference to FIG. 8. FIG. 8 is a view illustrating a part of the configuration of the storage device 1, focusing on a logical address management table. In the volatile memory 6 in FIG. 8, only a configuration of the logical address management table 63 in FIG. 1 is illustrated. The logical address management table of the volatile memory 6 in FIG. 8 has a layer structure to manage a broad logical address space and each information (or the same content thereof) is managed in the nonvolatile memory 4 too. The logical address management table of the volatile memory 6 in FIG. 8 is formed with a table 631 to manage a higher logical address and multiple tables 632, 633, and so on to manage lower logical addresses which are subject to the table 631. The multiple tables 632, 633, and so on to manage the lower logical addresses each correspond to one management unit of logical address (LBA) in the storage device 1. The tables 632, 633, and so on contain description as to whether the data of each sector is valid or invalid in each sector. The table 631 to manage the tables 632, 633 and so on contains description as to whether the multiple tables 632, 633, and so on to manage the lower logical addresses under control are valid or invalid. When there is no valid sector in the tables to manage the lower logical addresses, it is described in the table 631 that the table is invalid.

Subsequently, information of these tables 631, 632, 633 and so on is held in the nonvolatile memory 4 too. This information is written in, for example, different pages (writing units) of the nonvolatile memory 4 for each table. Although the table 631 to manage the higher logical addresses is always deployed on the volatile memory 6 from the nonvolatile memory 4, the multiple tables 632, 633, and so on to manage the lower logical addresses are read on the volatile memory 6 from the nonvolatile memory 4 if necessary. Also, in the above description, for ease of explanation, although an explanation is given with two layers including the tables 632, 633 and so on to manage logical addresses in management units at sector level and the higher table 631 to manage them, the layer structure may have a further layer, that is, the layer structure may have three layers or more.

Hereinafter, the tables 632, 633 and so on to manage logical addresses in management units at sector level are referred to as "lowest layer tables," and a table to manage all lowest layer tables among tables to manage lowest layer tables in a layered manner is referred to as "highest layer table." In FIG. 8, the table 631 is the highest layer table.

Figure 9:
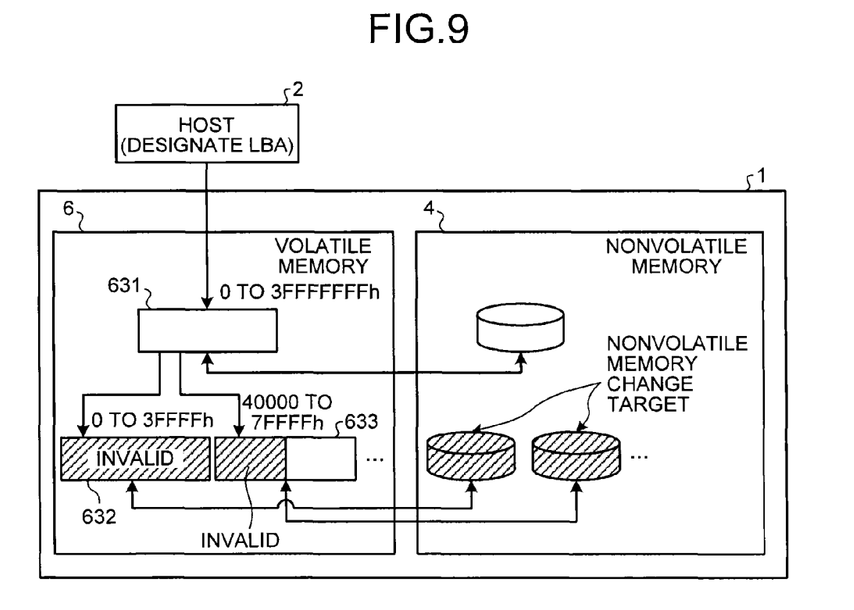
FIG. 9 is a view illustrating a state of invalidation of a logical address management table in the case of not overall user data area invalidation in an embodiment.

Therefore, in a case where an entire management unit is an invalidation target in FIG. 7, as illustrated in the table 632 in FIG. 9, it is necessary to rewrite the volatile memory 6 to invalidate all sectors of the table and similarly rewrite corresponding pages of the nonvolatile memory 4. Also, in a case where a part of management unit is an invalidation target in FIG. 7, as illustrated in the table 633 in FIG. 9, it is necessary to rewrite the volatile memory 6 to invalidate a part of sectors of the table and similarly rewrite corresponding pages of the nonvolatile memory 4. However, as long as the invalidation processing per management unit is performed as illustrated in FIG. 7, regardless of the fact that the invalidation target is a part or whole of the management unit, it is necessary to rewrite the nonvolatile memory 4 with respect to a page corresponding to the lowest layer table that manages each management unit.

Figure 10:
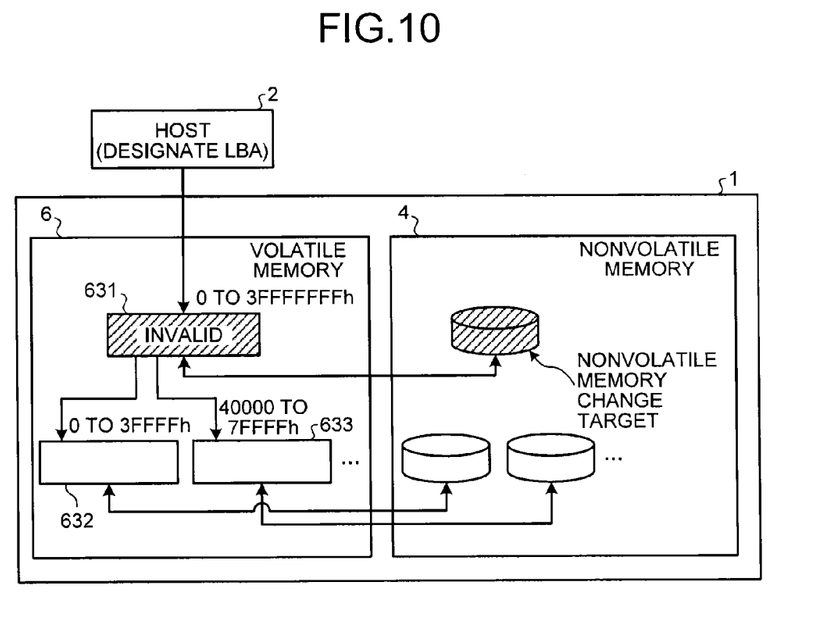
FIG. 10 is a view illustrating a state of invalidation of a logical address management table in the case of overall user data area invalidation in an embodiment.

However, when it is determined that it is the overall user data area invalidation in step S23 in FIG. 6 (step S23: Yes), the overall user data area may be subjected to collective deletion processing (step S24). Specifically, as illustrated in FIG. 10, for example, because it is required to invalidate only the table 631, which is the highest layer table and manages the higher logical addresses and manages logical addresses of the entire user data area, the number of corresponding pages required to be rewritten in the nonvolatile memory 4 is only one page, and therefore it is possible to perform invalidation processing at much higher speed than iterating invalidation processing per management unit.

After the collective deletion processing (step S24) or in a case where there is no internal logical address range that is not invalidated (step S21: No), the internal data invalidation processing (step S14 in FIG. 3) is finished. After that, in step S15 in FIG. 3, the invalidation instruction processor 51 transmits a data invalidation instruction end status to the host 2.

Second Embodiment

Figure 11:
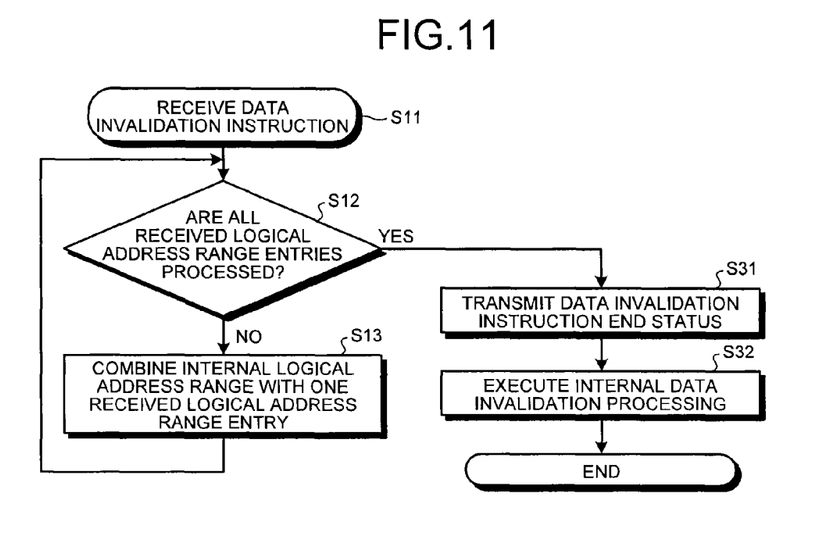
FIG. 11 is a flowchart illustrating operations in a case where a storage device according to a second embodiment receives a data invalidation instruction from a host.

With reference to the flowchart in FIG. 11, an explanation will be given on operations at the time the storage device 1 receives a data invalidation instruction from the host 2 in the present embodiment. FIG. 11 differs from FIG. 3 in that, when combination processing with respect to an internal logical address range is performed on all received logical address ranges of the invalidation area (step S12: Yes), first, the invalidation instruction processor 51 transmits a data invalidation instruction end status to the host 2 (step S31) and subsequently the invalidation executor 53 performs internal data invalidation processing (step S32). Other processings are the same as in the first embodiment and therefore their explanation will be omitted.

Third Embodiment

Figure 12:
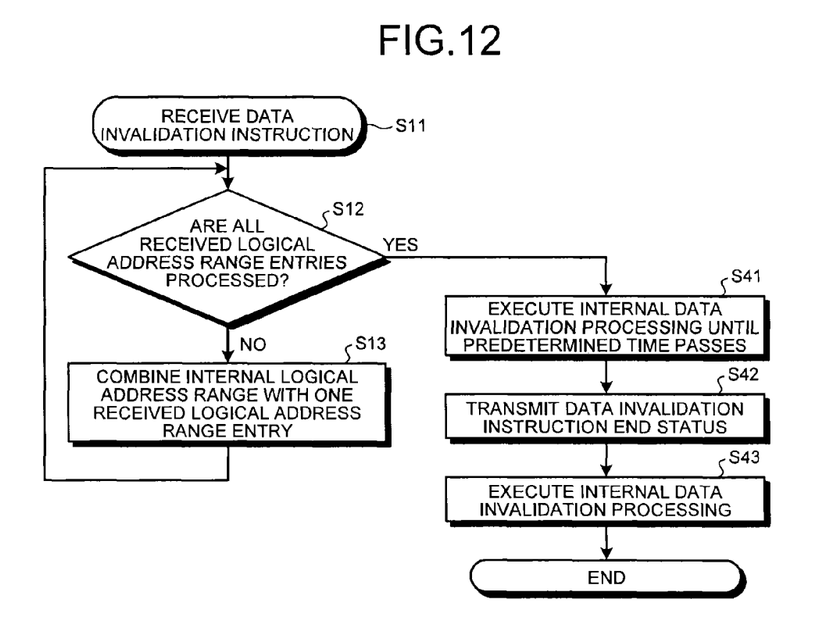
FIG. 12 is a flowchart illustrating operations in a case where the storage device according to the second embodiment receives a data invalidation instruction from the host.

With reference to the flowchart in FIG. 12, an explanation will be given on operations at the time the storage device 1 receives a data invalidation instruction from the host 2 in the present embodiment. In FIG. 12, when combination processing with respect to an internal logical address range is performed on all received logical address ranges of the invalidation area (step S12: Yes), although the invalidation executor 53 begins to perform internal data invalidation processing in the same way as in FIG. 3, at the time this processing is performed until a predetermined time passes (step S41), the invalidation instruction processor 51 transmits a data invalidation instruction end status to the host 2 (step S42). In step S41, for example, if there is a management unit for which invalidation processing is finished before the predetermined time passes, the invalidation processing is stopped at that time, or, at the time the processing is finished with respect to the last management unit among management units on which the invalidation processing can be performed within the predetermined time, the flow proceeds to step S42 to transmit a data invalidation instruction end status to the host 2. After that, the invalidation processing is performed on the remaining management units (step S43). Other processings are the same as in the first embodiment and therefore their explanation will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a host interface configured to be connected to a host, the host interface receiving an invalidation instruction from the host;
   a memory including a first buffer and a second buffer;
   a nonvolatile memory; and
   a controller configured to:
      store, in the first buffer, a logical address range designated by the invalidation instruction,
      combine the stored logical address range with an internal logical address range stored in the second buffer,
      store the combined internal logical address range in the second buffer, and
      execute invalidation processing on the nonvolatile memory based on the combined internal logical address range.

2. The storage device according to claim 1, wherein the invalidation processing includes:
   determining whether or not the combined internal logical address range is an overall user data area;
   executing first invalidation processing in a case that the combined internal logical address range is the overall user data area; and
   executing second invalidation processing different from the first invalidation processing in a case that the combined internal logical address range is not the overall user data area.

3. The storage device according to claim 2, wherein the memory further includes a logical address management table, the logical address management table including:
   a plurality of lower layer tables that manage whether data in a management unit is invalid or not for each management unit of logical address, and
   a higher layer table that manages the plurality of lower layer tables, wherein the nonvolatile memory stores the higher layer table; and
   the first invalidation processing includes invalidating the higher layer table stored in the nonvolatile memory.

4. The storage device according to claim 3, wherein
   the nonvolatile memory stores information of the plurality of lower layer tables, and
   the second invalidation processing includes invalidating information that corresponds to the combined internal logical address range among the information of the plurality of lower layer tables stored in the nonvolatile memory.

5. The storage device according to claim 1, wherein the controller transmits a data invalidation instruction end status to the host after the invalidation processing.

6. The storage device according to claim 1, wherein, after storing, in the second buffer, the combined internal logical address range, the controller transmits a data invalidation instruction end status to the host before the invalidation processing is executed.

7. The storage device according to claim 1, wherein, after passage of a predetermined time after the invalidation processing starts, the controller transmits a data invalidation instruction end status to the host and continues the invalidation processing after the transmission.

8. The storage device according to claim 3, wherein the management unit is a natural number multiple of a minimum access unit of logical address to be designated by the host, the natural number being two or more.

9. The storage device according to claim 8, wherein the memory is a volatile memory.

10. The storage device according to claim 9, wherein the nonvolatile memory is a NAND type flash memory.

11. A method for controlling a storage device, the storage device including a memory and a nonvolatile memory, the memory including a first buffer and a second buffer, the method comprising:
   receiving an invalidation instruction from a host;
   storing, in the first buffer, a logical address range designated by the invalidation instruction;
   combining the stored logical address range with an internal logical address range stored in the second buffer;
   storing the combined internal logical address range in the second buffer; and
   executing invalidation processing on the nonvolatile memory based on the combined internal logical address range.

12. The method according to claim 11, wherein the invalidation processing includes:
   determining whether or not the combined internal logical address range is an overall user data area;
   executing first invalidation processing in a case that the combined internal logical address range is the overall user data area; and
   executing second invalidation processing different from the first invalidation processing in a case that the combined internal logical address range is not the overall user data area.

13. The method according to claim 12, further comprising:
   storing a logical address management table in the memory, the logical address management table including a plurality of lower layer tables and a higher layer table, the plurality of lower layer tables managing whether data in a management unit is invalid or not for each management unit of logical address, the higher layer table managing the plurality of lower layer tables; and
   storing the higher layer table in the nonvolatile memory, wherein
   the first invalidation processing includes invalidating the higher layer table stored in the nonvolatile memory.

14. The method according to claim 13, further comprising:
storing information of the plurality of lower layer tables in the nonvolatile memory, wherein
the second invalidation processing includes invalidating information that corresponds to the combined internal logical address range among the information of the plurality of lower layer tables stored in the nonvolatile memory.

15. The method according to claim 11, further comprising transmitting a data invalidation instruction end status to the host after the invalidation processing.

16. The method according to claim 11, further comprising, after storing, in the second buffer, the combined internal logical address range, transmitting a data invalidation instruction end status to the host before the invalidation processing is executed.

17. The method according to claim 11, further comprising, after passage of a predetermined time after the invalidation processing starts, transmitting a data invalidation instruction end status to the host and continuing the invalidation processing after the transmission.

18. The method according to claim 13, wherein the management unit is a natural number multiple of a minimum access unit of logical address to be designated by the host, the natural number being two or more.

19. The method according to claim 18, wherein the memory is a volatile memory.

20. The method according to claim 19, wherein the nonvolatile memory is a NAND type flash memory.

* * * * *